UNITED STATES PATENT OFFICE.

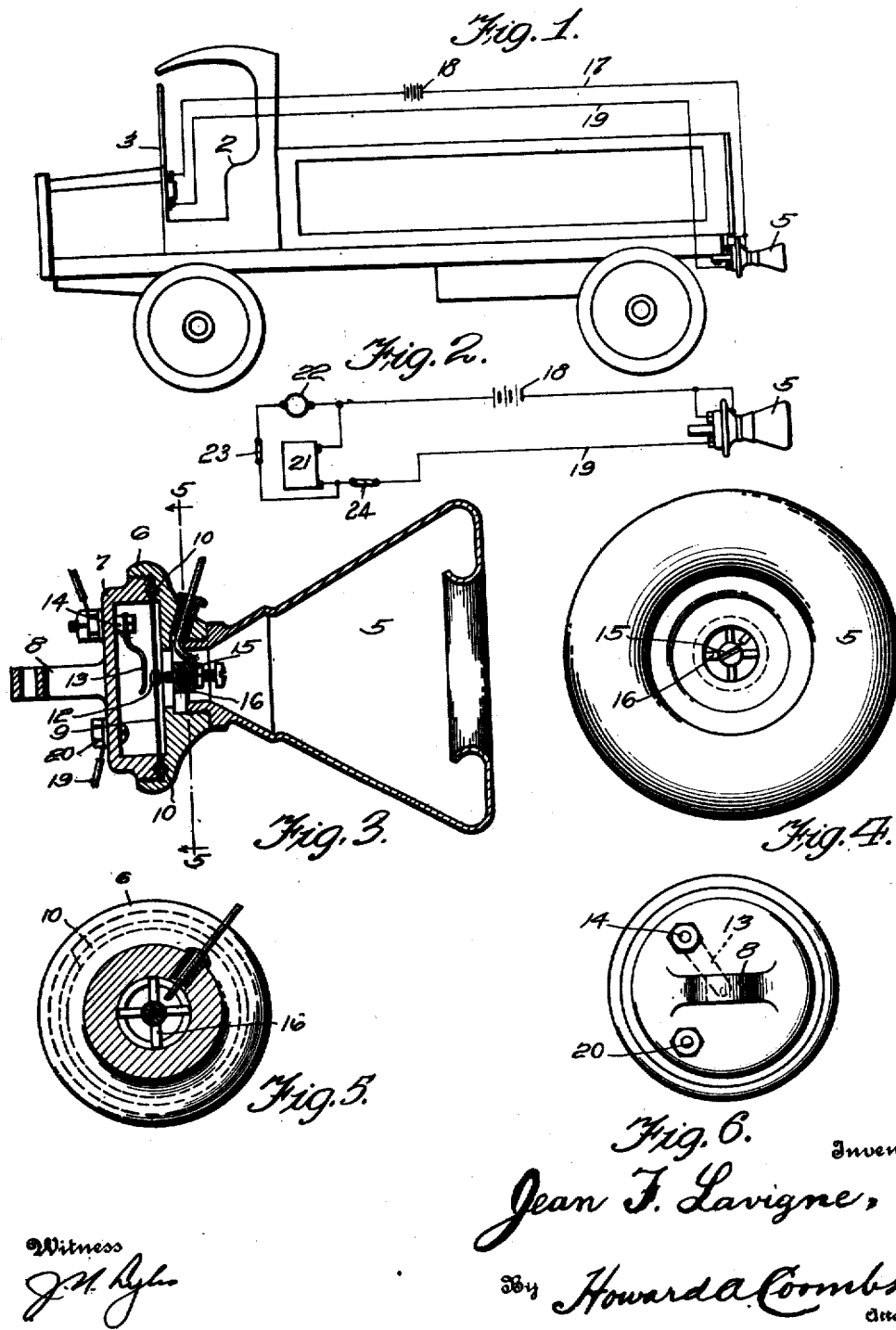

JEAN F. LAVIGNE, OF DANVILLE, PENNSYLVANIA.

SOUND-OPERATED ELECTRIC SIGNAL.

1,368,736.　　　　Specification of Letters Patent.　　Patented Feb. 15, 1921.

Application filed April 16, 1919. Serial No. 290,442.

*To all whom it may concern:*

Be it known that I, JEAN F. LAVIGNE, a citizen of the United States, residing at Danville, in the county of Montour and State of Pennsylvania, have invented new and useful Improvements in Sound-Operated Electric Signals, of which the following is a specification.

This invention relates to electric signals adapted to be actuated by sound waves, and consists in a sound receiving horn the diaphragm of which closes an electric circuit when vibrated, thus operating an audible or visible signal at a distance.

The invention is designed especially for application to motor vehicles, more particularly trucks, and its function, when so applied, is to enable the driver of a motor vehicle approaching from the rear and desirous of passing a truck so equipped, to attract the truck driver's attention in case he does not hear the horn. The horn of the approaching vehicle is sounded as usual and the sound waves are received by the horn forming part of my invention, are transmitted to the diaphragm at the base of the horn and this makes and breaks an electric circuit by which a buzzer is sounded or a light shown in front of the truck driver's seat, whereby he is notified with certainty that there is a vehicle behind desirous of passing. It is well known that the driver of a heavy motor truck does not hear the horn of a vehicle behind, owing to the noise made by his own vehicle, but with a truck equipped with my invention, he is obliged to become aware of the presence of the other vehicle in the rear. The horn is tuned and adjusted to be responsive to the average tones of motor vehicle horns and will receive and transmit signals emitted from a horn at a considerable distance, at least as much as one hundred feet when directly back of the receiving horn, or approximately so. The buzzer (or bell) can be used in the daytime and the light at night, or both can be used simultaneously, and both can be cut out when desired, as when the truck is on city streets, when the multiplicity of horns blown would keep the calling signal in almost continuous operation. The invention is particularly useful, as will be obvious, when the truck is on country roads where there is normally not enough room for a vehicle to pass another unless the one in front pulls to one side.

The invention will now be described in connection with the accompanying drawing, in which—

Figure 1 is a diagrammatic side elevation of a truck equipped with my invention;

Fig. 2 is a diagram of the electric circuits;

Fig. 3 is a longitudinal section through the horn;

Fig. 4 is an end view of the same;

Fig. 5 is a section on line 5—5 of Fig. 3; and

Fig. 6 is an end view looking from the left in Fig. 3.

In Fig. 1, a motor truck is conventionally represented at 1, 2 being the driver's seat and 3 the dashboard. 5 is the sound-receiving horn, screwed into the cap 6 of the diaphragm casing 7, which has a bracket 8 projecting outwardly from its back and by which it is attached to the rear end of the body of the truck, as shown in Fig. 1. The resilient diaphragm 9 is clamped, by the aid of a split ring 10, in grooves formed in the cap and casing, and is provided with a contact button 12 at its center. A spring contact 13 is mounted on an insulating post 14, screwed in the rear wall of the casing, and stands directly behind the said contact button, and a contact screw 15 is adjusted close to said button on the other side of the diaphragm, said screw being mounted in a spider 16 of insulating material, the ends of the arms of which are clamped between the end of the horn and a shoulder in the cap. The contact spring and screw are both connected to a wire 17 leading from a battery 18 on the truck, while the other wire 19 of the circuit leads to a terminal 20 mounted in the casing, thereby putting it and the metallic diaphragm in the circuit. 21 represents a buzzer and 22 a lamp, mounted on the dashboard 3, and arranged in parallel in the circuit, so that both will be operated when the circuit is closed. A switch 23 is provided so that the lamp can be cut out in the daytime and a switch 24 is placed in one of the main leads, as 19, so that both signals may be rendered inoperative. Of course, provision may be made for cutting out the buzzer and leaving the lamp operative, if desired.

When sound waves of sufficient intensity and suitable pitch enter the horn, the diaphragm is set in vibration, contacting alternately with the spring 13 and the screw 15 and closing the circuit at each contact, thereby actuating the buzzer or illuminating the light, or both, intermittently and attracting the attention of the driver.

While this is the purpose for which the invention was devised, it is obviously capable of use wherever it may be desired to operate an electric signal by means of sound waves.

What I claim is:—

1. The combination with a motor vehicle, of a sound-wave-receiving horn attached to the rear thereof, a diaphragm at the base of said horn, a battery and electric circuit on the vehicle, terminals for one branch of said circuit located in proximity to said diaphragm, one on each side thereof the other branch of said circuit leading to the diaphragm and a warning signal in said circuit, located in proximity to the driver's seat.

2. A motor truck attachment, comprising a warning signal near the driver's seat, a diaphragm horn on the rear of the vehicle, an electric circuit including said signal and the diaphragm, and a pair of contacts connected in parallel in said circuit and located one on each side of said diaphragm.

3. An equipment for motor vehicles to enable the driver to be warned of the approach of another vehicle from the rear, comprising a warning signal in proximity to the driver's seat, a sound wave receiving and responsive device on the rear of the vehicle, and electrical connections between said signal and sound wave responsive device.

4. Means to warn the driver of a vehicle of the approach from the rear of a vehicle equipped with sound producing means, comprising a sound wave receiving and responsive horn to be mounted on the rear of the driver's vehicle, a warning signal to be mounted adjacent to the driver's seat, a battery to be carried by the vehicle, and electrical connections between the battery, signal and horn such that the signal will be operated when sound waves of a certain nature encounter said horn.

In testimony whereof I have hereunto set my hand.

JEAN F. LAVIGNE.